US012514365B2

(12) United States Patent
Braun et al.

(10) Patent No.: US 12,514,365 B2
(45) Date of Patent: Jan. 6, 2026

(54) SLIDABLE SUPPORT STRUCTURE FOR MODULAR UNITS

(71) Applicant: Milwaukee Electric Tool Corporation, Brookfield, WI (US)

(72) Inventors: Christian R. Braun, Milwaukee, WI (US); Jedidiah J. Babinec, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 245 days.

(21) Appl. No.: 18/295,500

(22) Filed: Apr. 4, 2023

(65) Prior Publication Data

US 2023/0301429 A1 Sep. 28, 2023

Related U.S. Application Data

(63) Continuation of application No. PCT/US2023/015749, filed on Mar. 21, 2023.

(60) Provisional application No. 63/322,477, filed on Mar. 22, 2022.

(51) Int. Cl.

| | |
|---|---|
| ***A47B 88/00*** | (2017.01) |
| ***A47B 88/40*** | (2017.01) |
| ***A47B 88/407*** | (2017.01) |
| ***B25H 3/04*** | (2006.01) |

(52) U.S. Cl.
CPC .......... *A47B 88/402* (2017.01); *A47B 88/407* (2017.01); *B25H 3/04* (2013.01)

(58) Field of Classification Search
CPC ..... A47B 88/402; A47B 88/407; A47B 88/43; A47B 87/0207; A47B 2210/0018; A47B 2230/0096; A47B 2230/07; A47B 96/025; A47B 47/00; A47B 2031/005; A47B 2088/4235; A47B 2210/0016; B25H 3/04; B25H 3/021; B25H 3/06; B25H 3/028; B25H 3/02; A47F 5/0093; A47F 5/08
USPC ........ 312/107, 108, 111, 198, 333; 206/234, 206/373; 211/70.6, 134; 108/143
See application file for complete search history.

(56) References Cited

U.S. PATENT DOCUMENTS

| | | | |
|---|---|---|---|
| 3,424,334 | A | 1/1969 | Goltz |
| 4,871,217 | A | 10/1989 | Taylor et al. |
| 5,516,203 | A | 5/1996 | Branham et al. |

(Continued)

FOREIGN PATENT DOCUMENTS

| | | |
|---|---|---|
| CN | 204800609 | 11/2015 |
| CN | 105291075 | 2/2016 |

(Continued)

OTHER PUBLICATIONS

Inter Partes Review No. 2024-01400, "Petition for Inter Partes Review of U.S. Pat. No. 11,365,026" Filed Sep. 17, 2024, 147 pages.

(Continued)

*Primary Examiner* — Janet M Wilkens
(74) *Attorney, Agent, or Firm* — Reinhart Boerner Van Deuren s.c.

(57) ABSTRACT

One or more support structures for a modular system are provided. The support structures are configured to detachably couple with utility modules in a system, such as modular tool storage units. The support structure facilitates sliding the utility modules with respect to a surface the support structure is coupled to.

17 Claims, 7 Drawing Sheets

(56) References Cited

U.S. PATENT DOCUMENTS

| | | | | |
|---|---|---|---|---|
| 5,890,613 | A | 4/1999 | Williams | |
| 6,176,559 | B1 | 1/2001 | Tiramani et al. | |
| 6,322,177 | B1 | 11/2001 | Vasudeva | |
| 6,347,847 | B1 | 2/2002 | Tiramani et al. | |
| 6,578,937 | B1 | 6/2003 | Thoman | |
| 6,601,930 | B2 | 8/2003 | Tiramani et al. | |
| 6,983,946 | B2 | 1/2006 | Sullivan et al. | |
| 7,258,317 | B1 * | 8/2007 | Nagel | A47B 96/025 108/143 |
| 7,712,850 | B2 | 5/2010 | Vasudeva | |
| 7,823,991 | B2 | 11/2010 | Purdy | |
| 7,832,584 | B2 | 11/2010 | Eggers et al. | |
| 8,490,801 | B2 * | 7/2013 | Smith | F24C 15/16 126/339 |
| 8,657,307 | B2 | 2/2014 | Lifshitz et al. | |
| 8,740,010 | B1 | 6/2014 | Page | |
| 9,375,835 | B1 | 6/2016 | Lin | |
| D803,560 | S | 11/2017 | Kuhls | |
| D803,561 | S | 11/2017 | Kuhls | |
| 10,047,546 | B2 | 8/2018 | Brunner | |
| 10,182,628 | B2 | 1/2019 | Tonelli et al. | |
| 10,286,542 | B2 | 5/2019 | Wolle et al. | |
| 10,293,477 | B2 | 5/2019 | Wolle et al. | |
| 10,314,399 | B2 | 6/2019 | Wolle et al. | |
| 10,406,673 | B2 | 9/2019 | Shechtman et al. | |
| 10,583,962 | B2 | 3/2020 | Brunner et al. | |
| 10,750,833 | B2 | 8/2020 | Burchia | |
| 10,967,499 | B2 | 4/2021 | Yogev et al. | |
| 11,440,571 | B2 * | 9/2022 | Wolle | B62B 1/12 |
| 11,464,335 | B2 * | 10/2022 | Brunner | A47F 5/0846 |
| 11,612,998 | B1 * | 3/2023 | Byington | B25H 3/028 211/126.1 |
| 11,840,269 | B2 * | 12/2023 | Brunner | B62B 1/002 |
| 2002/0027403 | A1 | 3/2002 | Vasudeva | |
| 2002/0040880 | A1 | 4/2002 | Vasudeva | |
| 2003/0139080 | A1 | 7/2003 | Lafragette et al. | |
| 2004/0012314 | A1 | 1/2004 | Hay et al. | |
| 2006/0006770 | A1 | 1/2006 | Valentini | |
| 2007/0138041 | A1 | 6/2007 | Welsh | |
| 2007/0235397 | A1 | 10/2007 | Wannop | |
| 2009/0107938 | A1 * | 4/2009 | Miller, Jr. | A47F 5/137 16/415 |
| 2009/0145790 | A1 | 6/2009 | Panosian et al. | |
| 2011/0121695 | A1 | 5/2011 | Purdy | |
| 2011/0260588 | A1 | 10/2011 | Lin | |
| 2013/0127129 | A1 | 5/2013 | Bensman et al. | |
| 2014/0190917 | A1 * | 7/2014 | Szpak | A47B 96/024 211/134 |
| 2014/0265440 | A1 | 9/2014 | Chen et al. | |
| 2017/0166352 | A1 | 6/2017 | Hoppe et al. | |
| 2018/0161975 | A1 | 6/2018 | Brunner | |
| 2018/0186513 | A1 | 7/2018 | Brunner | |
| 2018/0200875 | A1 | 7/2018 | Wolle et al. | |
| 2019/0106244 | A1 | 4/2019 | Brunner et al. | |
| 2019/0225371 | A1 | 7/2019 | Hoppe et al. | |
| 2019/0247995 | A1 | 8/2019 | Hocine et al. | |
| 2020/0147781 | A1 | 5/2020 | Squiers et al. | |
| 2020/0165036 | A1 | 5/2020 | Squiers et al. | |
| 2020/0178686 | A1 | 6/2020 | Hermann et al. | |
| 2023/0036215 | A1 * | 2/2023 | Williams | B25H 3/06 |
| 2023/0122425 | A1 | 4/2023 | Camp et al. | |
| 2023/0157451 | A1 * | 5/2023 | Flagin | A47B 88/57 312/330.1 |
| 2024/0010390 | A1 * | 1/2024 | Braun | A47B 57/10 |
| 2024/0130541 | A1 * | 4/2024 | Eden | A47F 5/0043 |

FOREIGN PATENT DOCUMENTS

| | | | | |
|---|---|---|---|---|
| CN | 206643887 | | 11/2017 | |
| CN | 208887986 | | 5/2019 | |
| DE | 1246625 | | 8/1967 | |
| DE | 1253198 | | 10/1967 | |
| DE | 4207878 | | 9/1993 | |
| DE | 29812086 | | 10/1998 | |
| DE | 102012218653 | | 4/2013 | |
| DE | 202014103695 | | 10/2014 | |
| DE | 202014103228 | | 11/2015 | |
| DE | 212017000011 | | 3/2018 | |
| EP | 0482337 | | 12/1997 | |
| EP | 1724069 | A2 | 11/2006 | |
| EP | 1563965 | | 12/2006 | |
| EP | 2537641 | B1 | 9/2016 | |
| EP | 2338650 | B1 | 10/2016 | |
| GB | 2211486 | | 7/1989 | |
| JP | 2008-251943 | | 10/2008 | |
| NL | 9301698 | A * | 5/1995 | A47F 1/121 |
| SE | 521374 | C2 * | 10/2003 | A47B 96/025 |
| WO | WO05021221 | | 3/2005 | |
| WO | WO2014/125484 | | 8/2014 | |
| WO | WO-2018213560 | A1 * | 11/2018 | A45C 13/02 |
| WO | WO19081711 | | 5/2019 | |
| WO | WO2021/137205 | | 7/2021 | |

OTHER PUBLICATIONS

Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.

(56) References Cited

OTHER PUBLICATIONS

Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.
International Search Report and Written Opinion for International Application No. PCT/US2023/015749, dated Jul. 7, 2023, 11 pages.

* cited by examiner

SLIDABLE SUPPORT STRUCTURE FOR MODULAR UNITS

CROSS-REFERENCE TO RELATED PATENT APPLICATIONS

The present application is a continuation of International Application No. PCT/US2023/015749, filed Mar. 21, 2023, which claims the benefit of and priority to U.S. Provisional Application No. 63/322,477, filed on Mar. 22, 2022, each of which is incorporated herein by reference in its entirety.

BACKGROUND OF THE INVENTION

The present disclosure is directed generally to the field of containers and related devices. The present disclosure relates specifically to support platforms configured to support and detachably couple to units items within a modular system.

Tool storage units are often used to transport tools and tool accessories. Some storage units are designed to incorporate into a modular storage system. Various platforms can be configured to support units within a modular system, such as a platform that slidably couples units to a vertical surface, such as a wall.

SUMMARY OF THE INVENTION

One embodiment of the invention relates to a support structure including a base configured to couple to a wall, a first arm rigidly coupled to the base, a second arm slidably coupled to the first arm, the second arm actuating with respect to the first arm between a fully retracted position and a fully extended position, and a platform rigidly coupled to the second arm such that the platform moves outward from the base when the second arm moves from the fully retracted position to the fully extended position. The platform includes a plurality of female couplers configured to detachably couple the platform to a modular storage unit. Each female coupler of the plurality of female couplers includes two ribs extending towards each other above and offset from a recessed surface.

Another embodiment of the invention relates to a support structure including a base configured to couple to a wall, a first arm rigidly coupled to the base, a second arm slidably coupled to the first arm, the second arm actuating with respect to the first arm between a fully retracted position and a fully extended position, and a platform rigidly coupled to the second arm. The platform includes a plurality of couplers configured to detachably couple the platform to a modular storage unit. Each coupler of the plurality of couplers includes a central wall, a first rib, and a second rib. The first rib and second rib extend from the central wall away from each other. The first rib extends above and offset from a first recessed surface and the second rib extends above and offset from a second recessed surface.

Another embodiment of the invention relates to a support structure including a base configured to couple to a wall, a first arm coupled to the base, a second arm slidably coupled to the first arm, the second arm actuating with respect to the first arm between a fully retracted position and a fully extended position, a locking mechanism actuating between an unlocked configuration, a first locked configuration, and a second locked configuration, and a platform rigidly coupled to the second arm. The locking mechanism biases the second arm to remain in the fully retracted position when the locking mechanism is in the first locked configuration, and the locking mechanism biases the second arm to remain in the fully extended position when the locking mechanism is in the second locked configuration. The platform includes a plurality of female couplers configured to detachably couple the platform to a modular storage unit. The platform further includes a latch recess configured to receive a latch extending from the modular storage unit, the interface between the latch recess and the latch biasing the modular storage unit to remain coupled to the platform via the plurality of female couplers.

Another embodiment of the invention relates to a support structure. The support structure includes a base configured to couple to a wall, a first arm rigidly coupled to the base, a second arm slidably coupled to the first arm, and a platform rigidly coupled to the second arm. The second arm actuates with respect to the first arm between a fully retracted position and a fully extended position. The platform includes a plurality of female couplers configured to detachably couple the platform to a modular storage unit, and each female coupler of the plurality of female couplers includes two ribs extending above a recessed surface.

In various embodiments, the support structure includes a locking mechanism actuating between an unlocked configuration, a first locked configuration, and a second locked configuration. When the locking mechanism is in the first locked position, the locking mechanism biases the second arm to remain in the fully retracted position with respect to the first arm. When the locking mechanism is in the second locked position, the locking mechanism biases the second arm to remain in the fully extended position with respect to the first arm.

In various embodiments, the platform includes a latch recess configured to receive a latch extending from the modular storage unit. The interface between the latch recess and the latch biases the modular storage unit to remain coupled to the platform.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
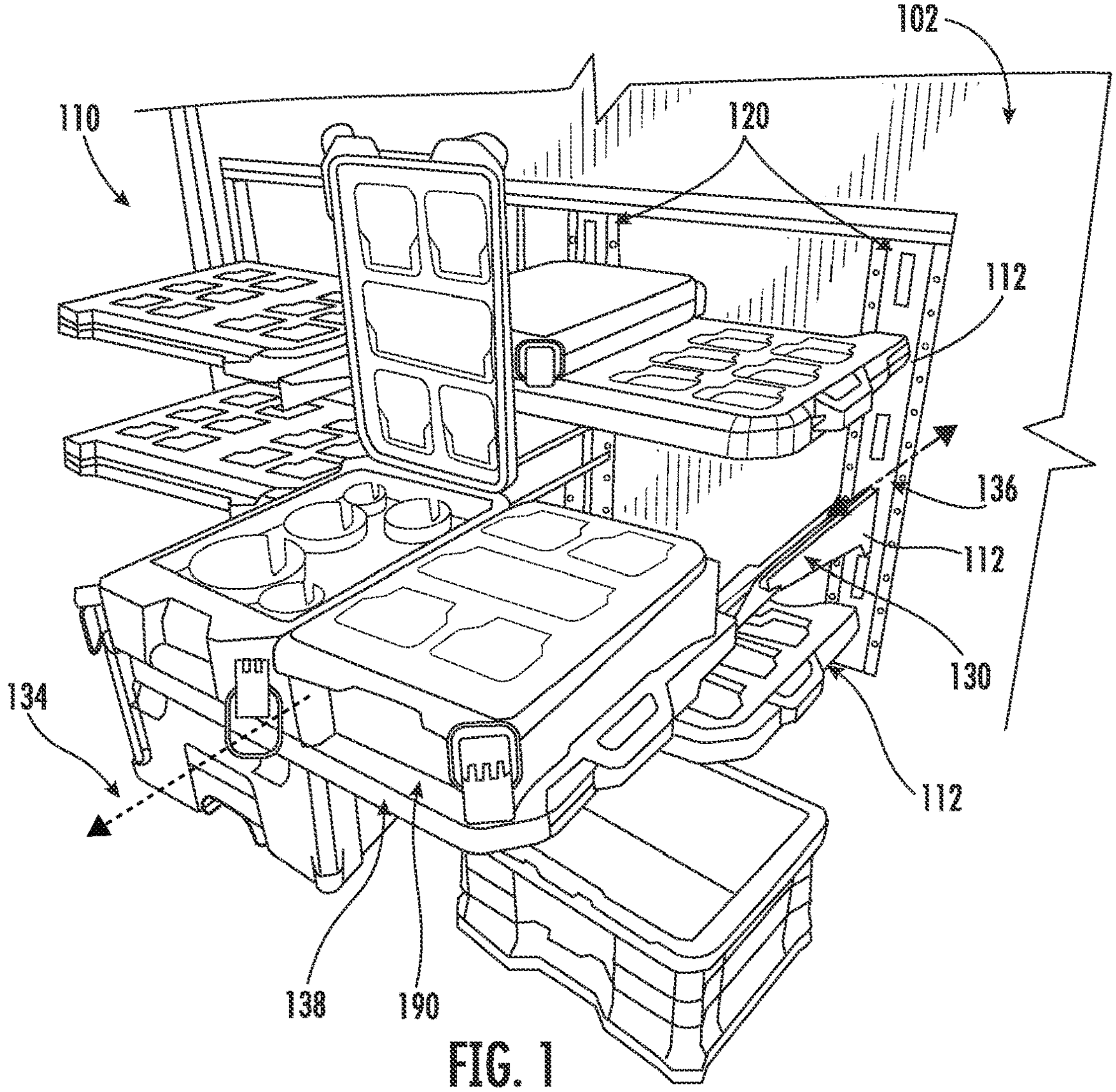
FIG. 1 is a perspective view of a support structure, according to an exemplary embodiment.
Figure 2:
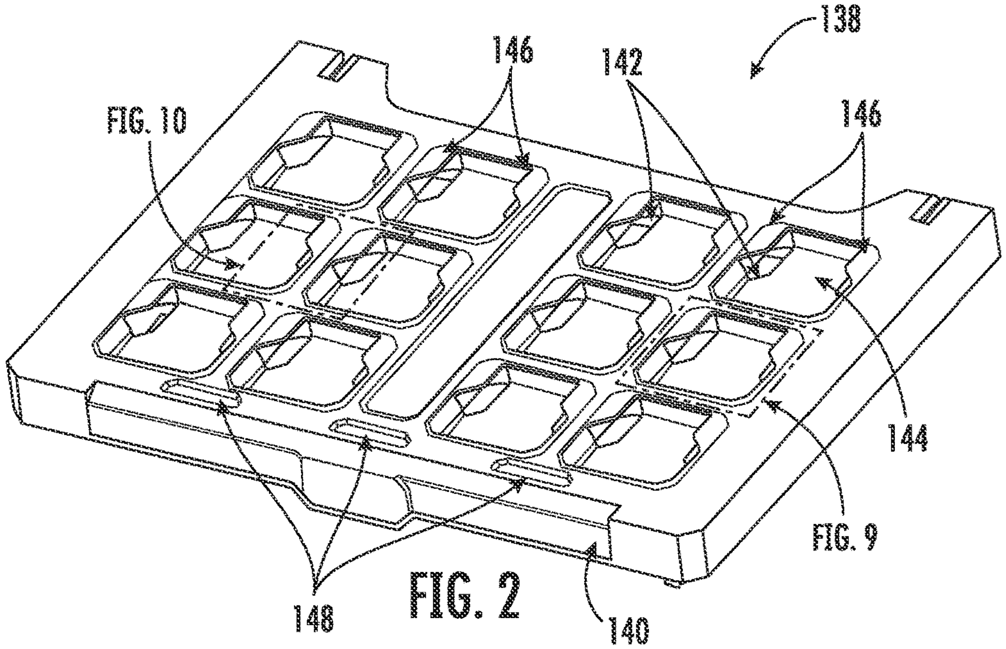
FIG. 2 is a perspective view of a platform of the support structure of FIG. 1, according to an exemplary embodiment.

Referring generally to the figures, support structures that support utility modules within a modular system are shown. One support structure couples to a vertical surface, such as a wall, and includes multiple slidable platforms that each couple to utility modules within the modular system. When utility modules are stacked directly on top of each other, to access a utility module within the middle of the stack, the targeted utility module and all utility modules above the targeted utility module may need to be removed from the stack. This can be difficult in situations in which the utility modules above the targeted utility module are heavy.

The support structure described herein facilitates accessing a targeted utility module coupled to a platform when there are other utility modules above the targeted utility module. In various embodiments, the targeted utility module is mechanically and reversibly coupled to a platform. To access a targeted utility module, the user slides the corresponding platform into an extended position. In various embodiments the platform is configured to lock in the extended position. Locking the platform in the extended position facilitates coupling and/or decoupling the utility module to the platform for various embodiments in which the utility module and platform slide with respect to each other when engaging and disengaging.

The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, beverage containers, etc., of any shape and size, and wherein any utility module can be detachably attached to the modular system.

Referring to FIGS. 1-10, support structure 110 for utility modules within a modular system is shown according to an exemplary embodiment. Support structure 110 includes base 120 configured to couple to a surface, such as a vertical surface like wall 102 (e.g., a wall of a structure, a wall of a vehicle). Support structure 110 includes one or more support units 112, each of which is configured to slidably support a utility module. In various embodiments, each support unit 112 includes two first arms 130, two second arms 132 each coupled to a first arm 130, and a platform 138 coupled to the second arms 132. In a specific embodiment, support structure 110 includes a first arm 130 rigidly coupled to base 120, a second arm 132 slidably coupled to first arm 130, the second arm 132 actuating with respect to the first arm 130 between a fully retracted position and a fully extended position.

First arm 130 is coupled to base 120, such as rigidly coupled. Second arm 132 is coupled to first arm 130, such as slidably coupled. Second arm 132 actuates with respect to first arm 130 along axis 136 between a fully retracted position and a fully extended position. In various embodiments, the second arm 132 slides in direction 134 when moving from the fully retracted position to the fully extended position.

Platform 138 is coupled to second arm 132, such as rigidly coupled, such that the platform 138 moves outward from the base 120 when the second arm 132 moves from the fully retracted position to the fully extended position. Platform 138 defines a front surface 140 facing away from base 120. Platform 138 includes one or more female couplers 310 and/or couplers 360. In various embodiments, female couplers 310 are arranged in a grid-like arrangement with respect to front surface 140 (e.g., 4×3 as shown). In various embodiments, female couplers 310 include one or more ribs 322, 332 (e.g., first rib 322 and second rib 332) that extend above recessed surface 312 of the respective female coupler 310.

Platform 138 is configured to detachably couple to a utility module, such as a modular storage unit, shown as storage unit 190, such as via couplers and/or female couplers. Female couplers 310 detachably couple with male couplers that extend from a bottom surface of storage unit 190.

To engage storage unit 190 with the platform 138, male couplers extending from a bottom of the storage unit 190 are inserted in the female couplers 310 and/or couplers 360 and the storage unit 190 slides towards base 120 with respect to platform 138. As will be explained, in various embodiments platform 138 is configured to lock in the extended position. Platform 138 being locked in the extended position facilitates coupling storage unit 190 to platform 138 because platform 138 is biased to remain stationary with respect to storage unit 190 while storage unit 190 slides towards base 120.

Platform 138 includes one or more latch recesses 148 (e.g., a plurality of latch recesses 148) configured to receive a latch extending from storage unit 190. The interface between the latch recess 148 and the latch biases the storage unit 190 to remain coupled to the platform 138 (such as via the plurality of female couplers 310 and/or the plurality of couplers 360). In particular, the interface between the latch recess 148 and the latch biases male couplers extending from a bottom of storage unit 190 to remain engaged with and coupled to ribs 322, 332 of female couplers 310. Stated another way, the interface between the latch and the respective latch recess 148 of the plurality of latch recesses 148 biases the storage unit 190 to remain coupled to the platform 138 via the plurality of female couplers 310 and/or the plurality of couplers 360. In various embodiments, the latch recess 148 is positioned between a front surface 140 of the platform 138 and the plurality of female couplers 310 and the plurality of couplers 360.

Support structure 110 includes locking mechanism 150. Locking mechanism 150 actuates between an unlocked configuration and at least one of a first locked configuration and a second locked configuration. In a specific embodiment, locking mechanism 150 actuates between an unlocked configuration, a first locked configuration, and a second locked configuration. In the unlocked configuration, second arm 132 and platform 138 are permitted to slide with respect to first arm 130. Locking mechanism 150 biases second arm 132 to remain in the fully retracted position with respect to first arm 130 when the locking mechanism 150 is in the first locked configuration. Locking mechanism 150 biases second arm 132 to remain in the fully extended position with respect to first tab 170 of first arm 130 when the locking mechanism 150 is in the second locked configuration.

Figure 3:
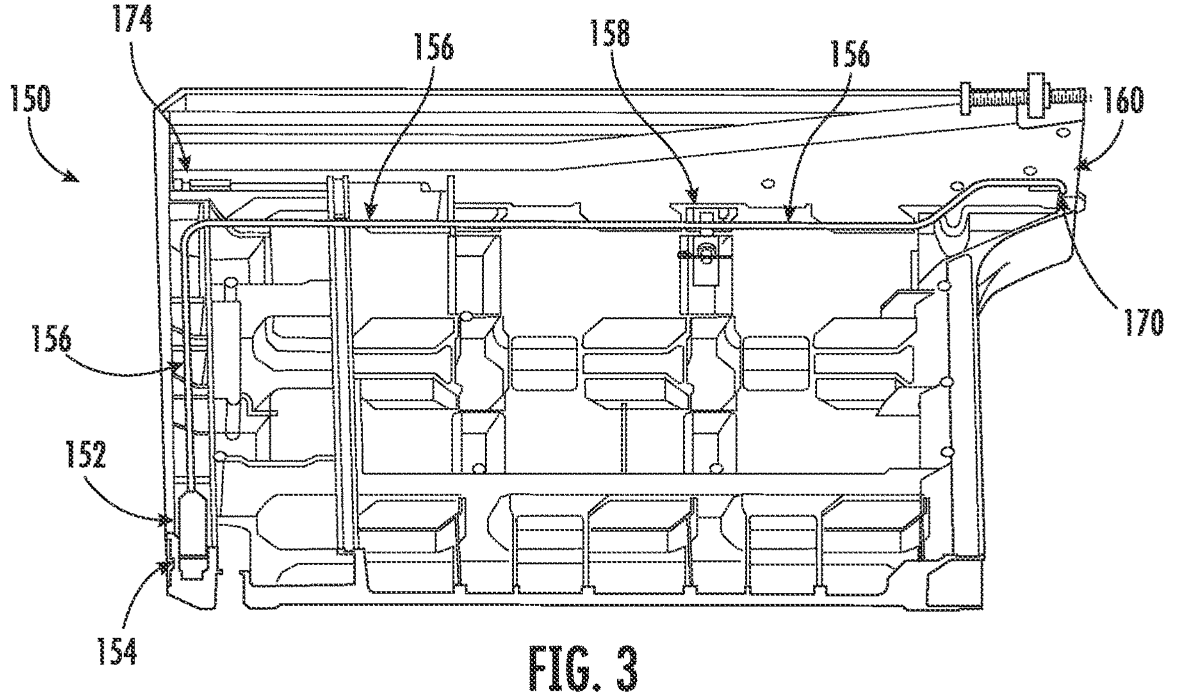
FIG. 3 is a perspective view from below of a portion of the support structure of FIG. 1, according to an exemplary embodiment.
Figure 4:
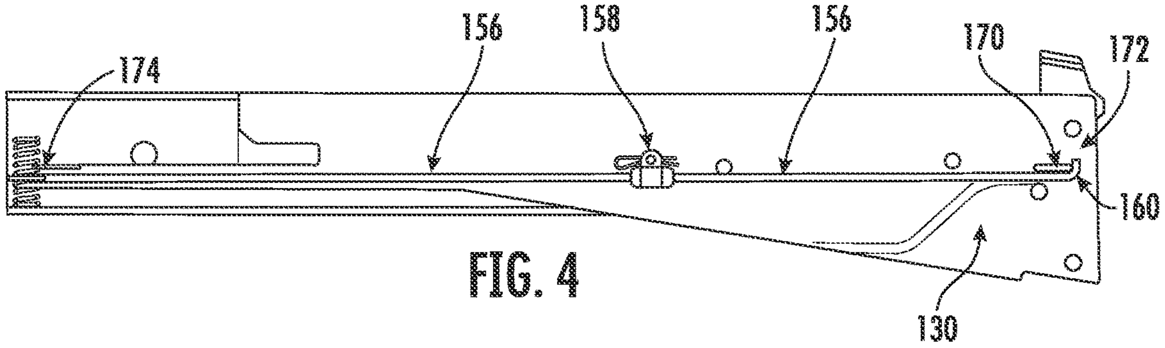
FIG. 4 is a side view of a portion of the support structure of FIG. 1, according to an exemplary embodiment.
Figure 5:
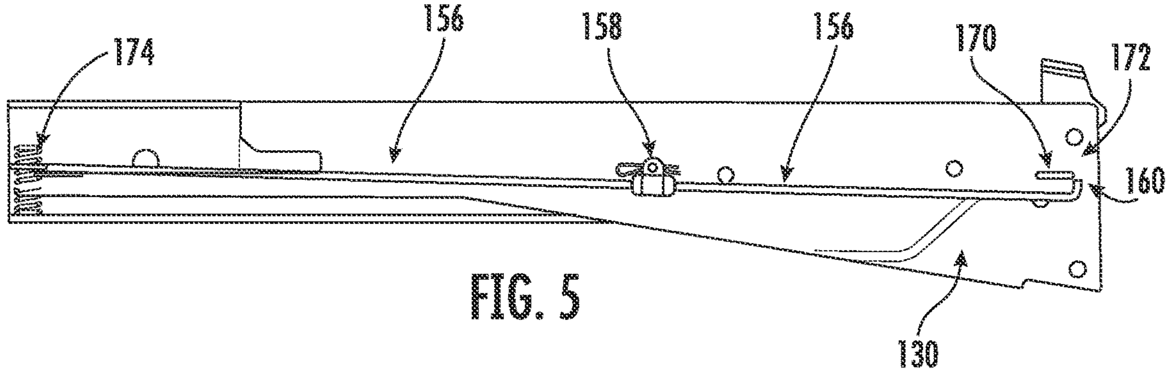
FIG. 5 is a side view of a portion of the support structure of FIG. 1, according to an exemplary embodiment.

Referring to FIGS. 3-5, various aspects of support structure 110 are shown when second arm 132 is in the fully retracted position with respect to first arm 130. Locking mechanism 150 includes a user-interface element, shown as plate 152. To actuate locking mechanism 150, a user presses on plate 152 against a biasing force exerted by spring 154. As a result, rod 156 rotates about pin 158, thereby decoupling protrusion 160 at end of rod 156 from first arm 130.

Referring to FIG. 4, when locking mechanism 150 is in the first locked configuration, protrusion 160 extends within aperture 172 of first tab 170, thereby biasing second arm 132 to remain stationary with respect to first arm 130 when second arm 132 is in the fully retracted position. The locking mechanism 150 being configured to lock the second arm 132 in the fully retracted position is useful when the support structure 110 is coupled to a movable object, such as a vehicle (e.g., an internal wall in a truck), and the user wants to reduce possible movement of elements within the support structure 110 while the vehicle is moving. Referring to FIG. 5, after the user actuates locking mechanism 150, protrusion 160 is decoupled from first tab 170, thereby permitting second arm 132 to slide with respect to first arm 130.

Figure 6:
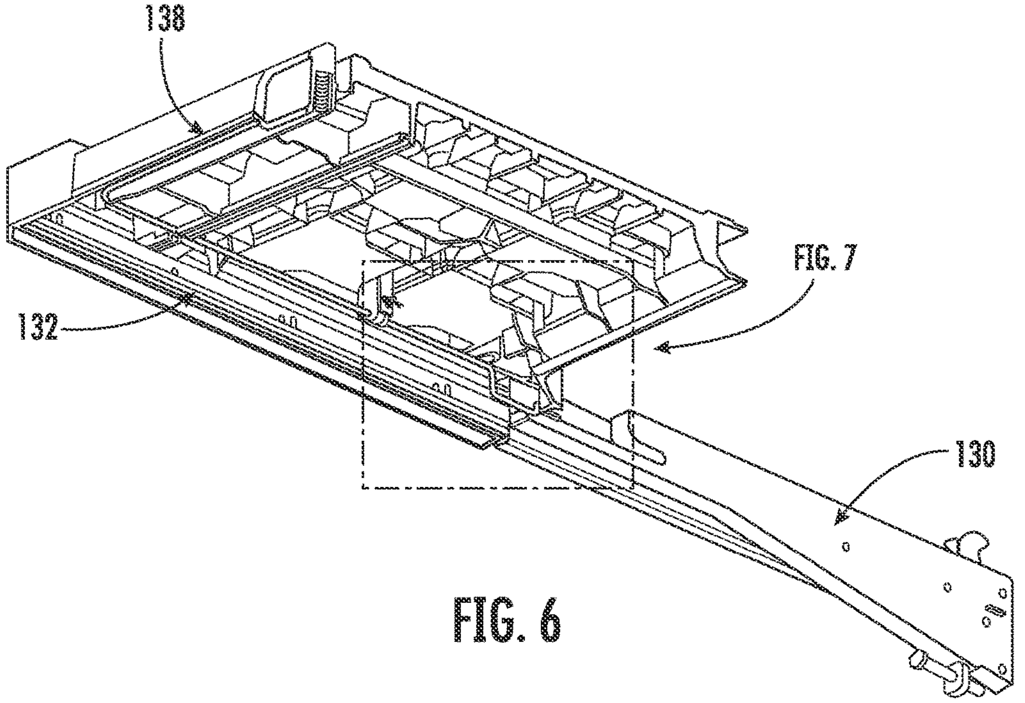
FIG. 6 is a perspective view from below of a portion of the support structure of FIG. 1, according to an exemplary embodiment.
Figure 7:
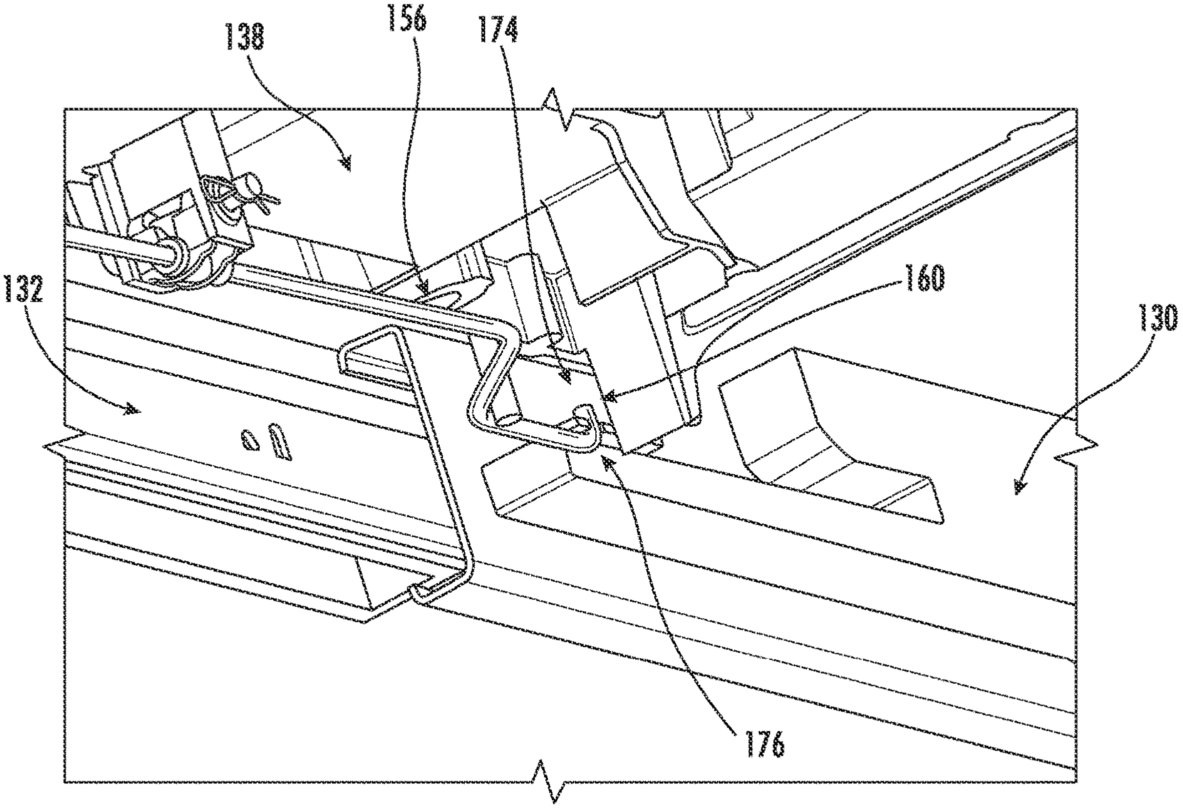
FIG. 7 is a detailed perspective view from below of a portion of the support structure of FIG. 1, according to an exemplary embodiment.
Figure 8:
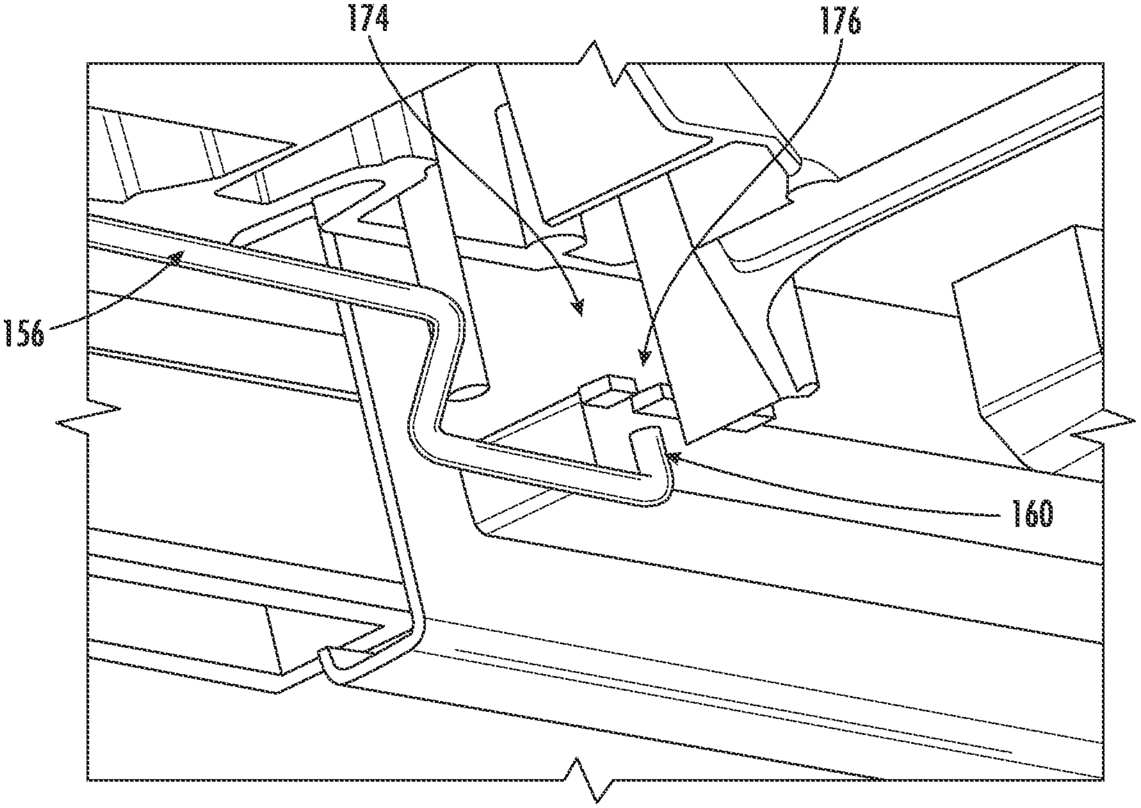
FIG. 8 is a detailed perspective view from below of a portion of the support structure of FIG. 1, according to an exemplary embodiment.

Referring to FIGS. 6-8, various aspects of support structure 110 are shown when second arm 132 is in the fully extended position with respect to first arm 130. Referring to FIG. 7, protrusion 160 extends within aperture 176 of second tab 174, thereby biasing second arm 132 to remain stationary with respect to first arm 130 when second arm 132 is in the fully extended position. Referring to FIG. 8, after the user actuates locking mechanism 150, protrusion 160 is decoupled from second tab 174, thereby permitting second arm 132 to slide with respect to first arm 130.

In various embodiments, female couplers 310, couplers 360, and latch recesses 148 are compatible with the coupling mechanism(s) described in International Patent International Patent Publication No. WO 2017/191628, which is hereby incorporated by reference in its entirety.

Figure 9:
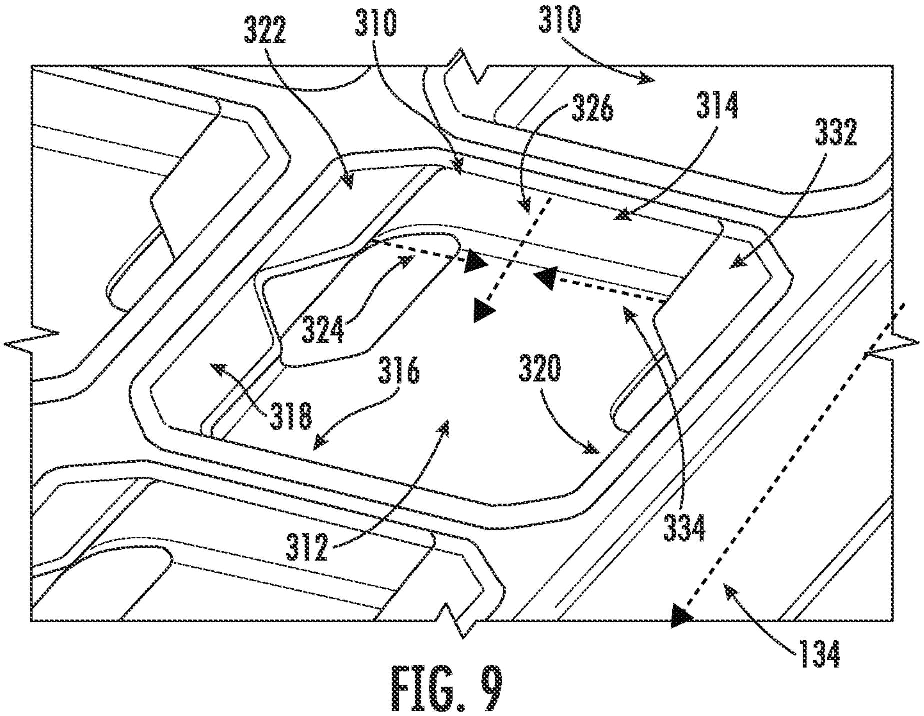
FIG. 9 is a detailed perspective view of the support structure of FIG. 1, according to an exemplary embodiment.

FIG. 9 depicts a detailed view of coupling structures provided by platform 138. In various embodiments, platform 138 includes a plurality of female couplers 310 configured to detachably couple the platform 138 to a modular storage unit (e.g., storage unit 190). Each female coupler 310 of the plurality of female couplers 310 includes a rear wall 314, a front wall 316 opposite the rear wall 314, a first sidewall 318 and a second sidewall 320 opposite the first sidewall 318, the first sidewall 318 and the second sidewall 320 extending between front wall 316 and rear wall 314. Each of the plurality of female couplers 310 includes a first rib 322 extending from the first sidewall 318 in direction 324 towards second sidewall 320 and direction 326 from the rear wall 314 towards front wall 316, and a second rib 332 extending from the second sidewall 320 in direction 334 towards first sidewall 318 and direction 326 from the rear wall 314 towards front wall 316. Each of first rib 322 and second rib 332 are above and offset from recessed surface 312.

In a specific embodiment, each female coupler 310 of the plurality of female couplers 310 includes two ribs (e.g., first rib 322 and second rib 332) extending towards each other above and offset from recessed surface 312. In a specific embodiment, each female coupler 310 includes rear wall 314 and each of two ribs (e.g., first rib 322 and second rib 332) extending from the rear wall 314 in direction 326 parallel to the direction 134 that second arm 132 slides with respect to first arm 130. In various embodiments, first rib 322 extends from first sidewall 318 in a direction 324 perpendicular to direction 134, and second rib 332 extends from second sidewall 320 in direction 334 perpendicular to direction 134 and opposite direction 324. In a specific embodiment, the plurality of female couplers 310 includes at least six couplers arranged in a grid (e.g., 3×2 as shown on the right-half of platform 138, or 3×4 over the entirety of platform 138). In a specific embodiment, platform includes 138 a plurality of female couplers 310, and each female coupler 310 of the plurality of female couplers 310 includes two ribs configured to engage with tongues extending from the modular storage unit.

Figure 10:
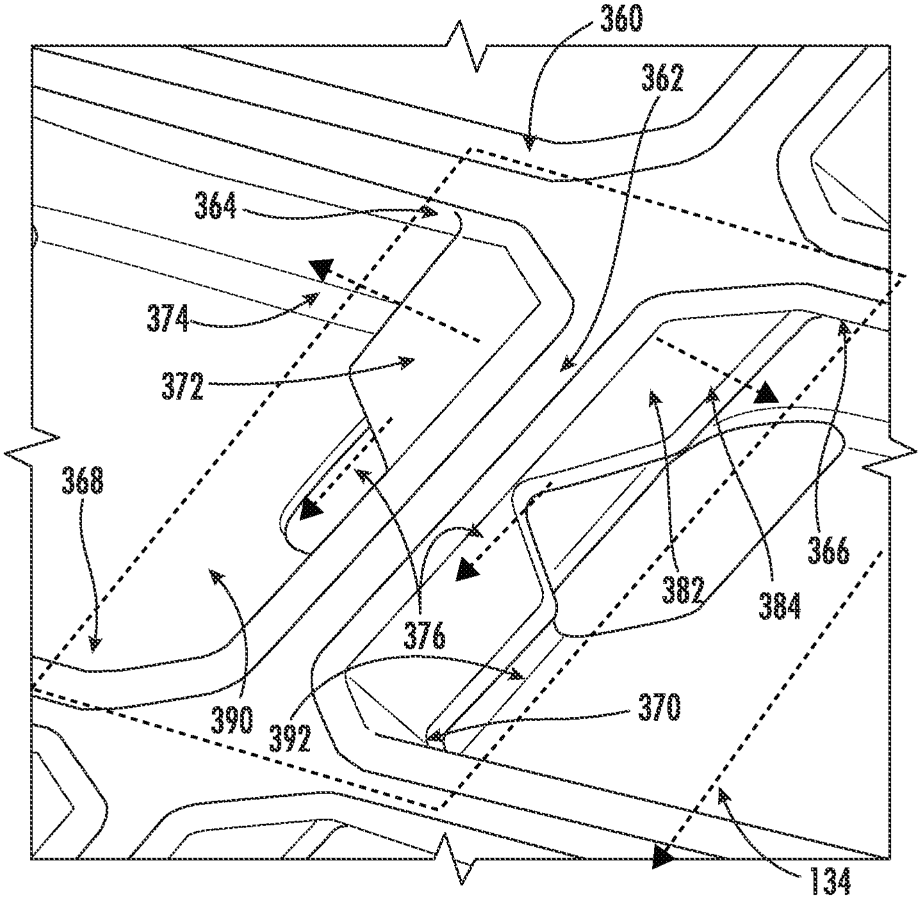
FIG. 10 is a detailed perspective view of the support structure of FIG. 1, according to an exemplary embodiment.
Figure 11:
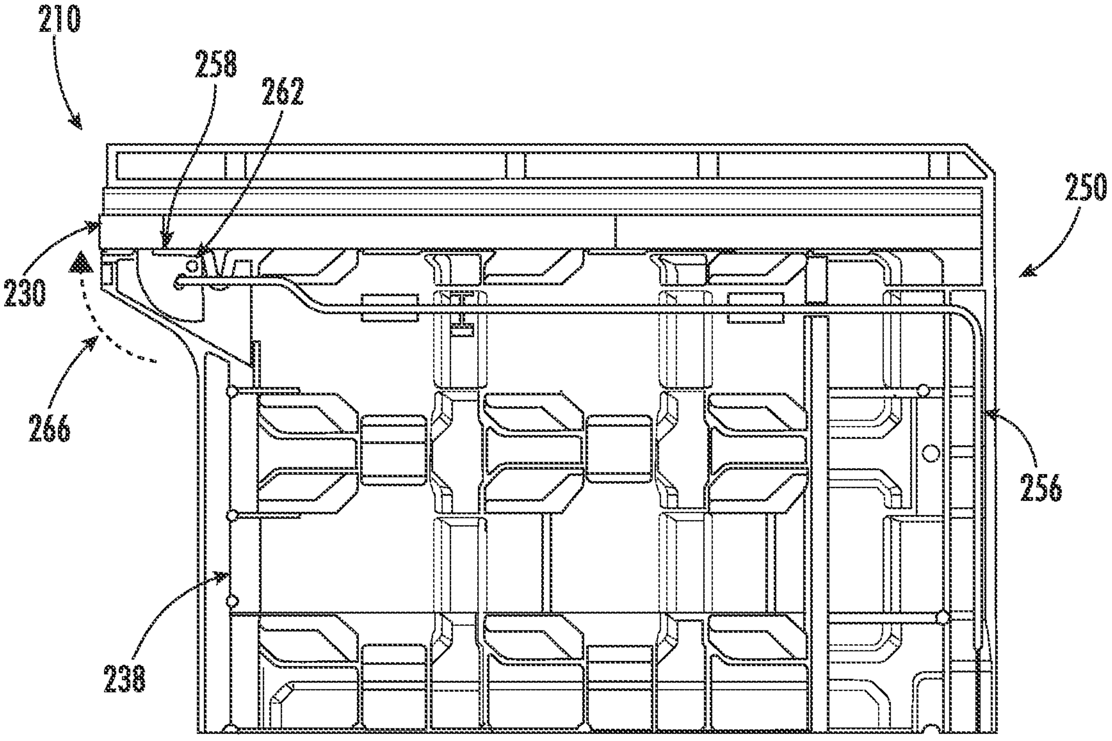
FIG. 11 is a bottom view of a support structure, according to another exemplary embodiment.
Figure 12:
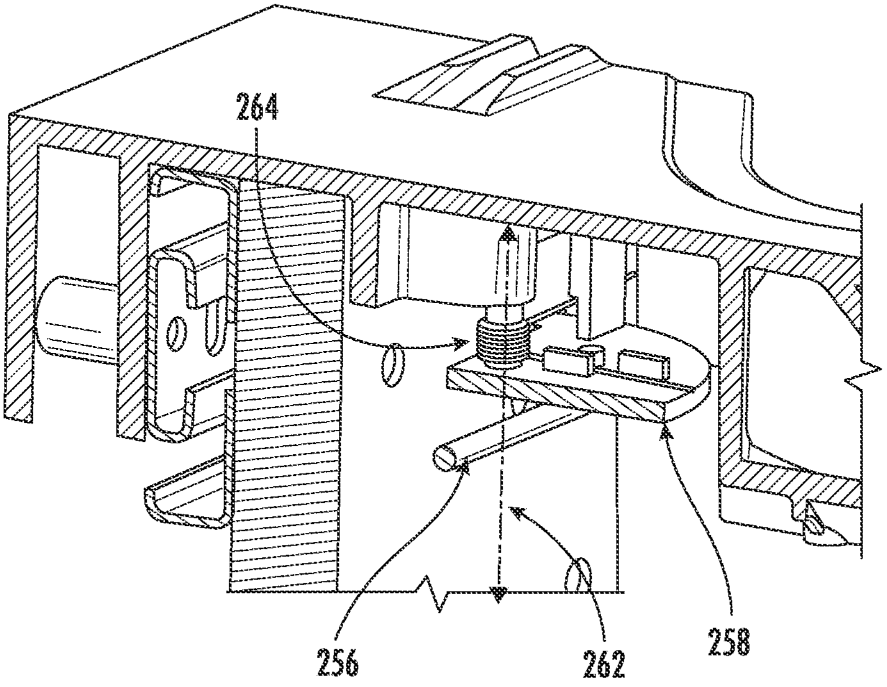
FIG. 12 is a perspective view from below of a portion of the support structure of FIG. 11, according to an exemplary embodiment.
Figure 13:
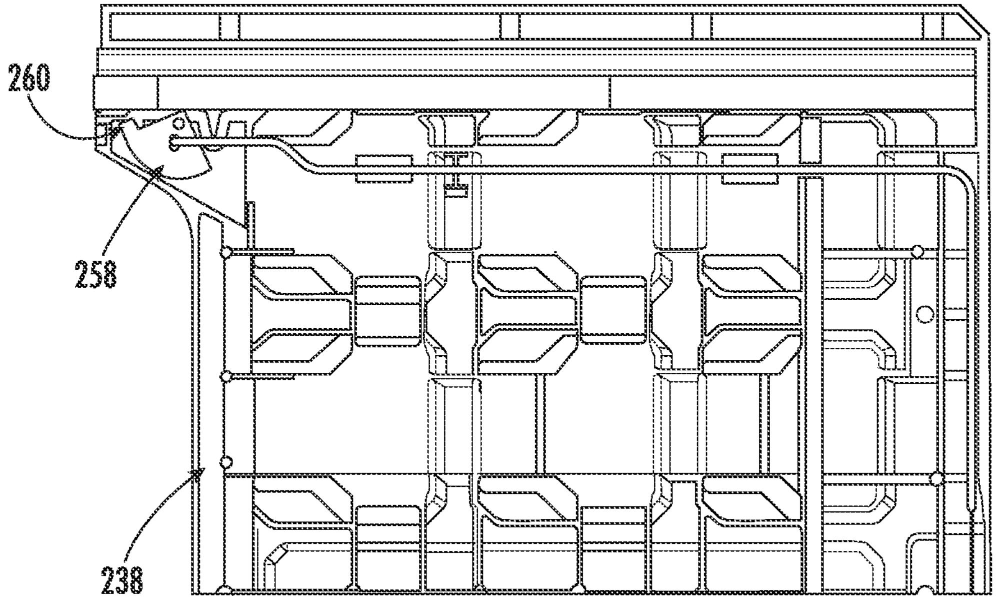
FIG. 13 is a bottom view of a portion of the support structure of FIG. 11, according to an exemplary embodiment.
Figure 14:
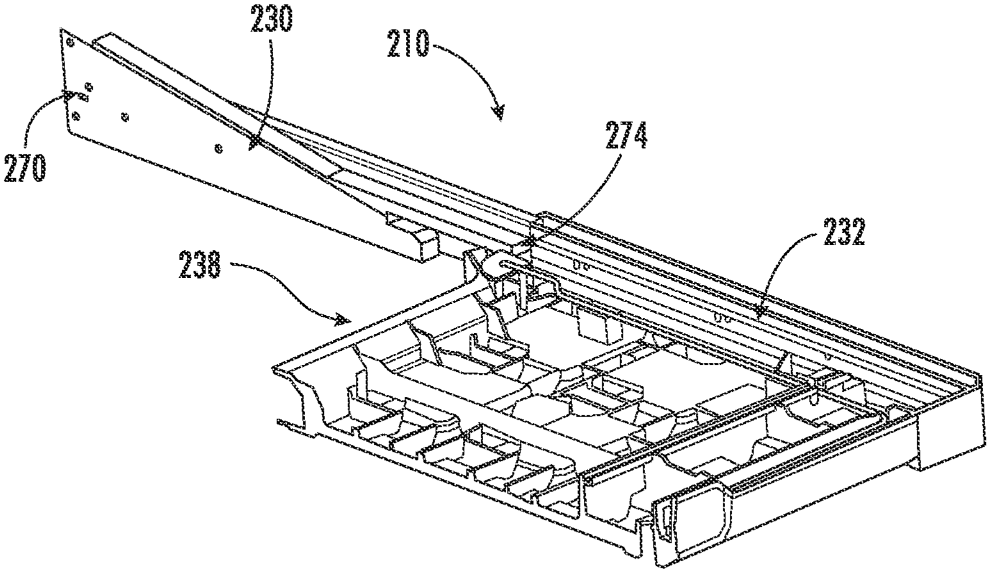
FIG. 14 is a perspective view from below of a portion of the support structure of FIG. 11, according to an exemplary embodiment.

FIG. 10 depicts a detailed view of coupling structures provided by platform 138. In various embodiments, platform 138 includes a plurality of couplers 360 configured to detachably couple the platform 138 to a modular storage unit (e.g., storage unit 190). Each coupler 360 of the plurality of couplers 360 includes a central wall 362, a first rear wall 364 and a second rear wall 366 extending from central wall 362 away from each other, a first front wall 368 and a second front wall 370 extending from central wall 362 away from each other in front of the first rear wall 364 and the second rear wall 366, respectively. Each coupler 360 includes a first rib 372 extending in direction 374 from central wall 362 and direction 376 from first rear wall 364, and second rib 382 extending in direction 384 from central wall 362 and direction 376 from second rear wall 366. First rib 372 is above and offset from first recessed surface 390 and second rib 382 is above and offset from second recessed surface 392.

In a specific embodiment, each coupler 360 of the plurality of couplers 360 includes a central wall 362, a first rib 372, and a second rib 382, the first rib 372 and second rib 382 extending from the central wall 362 away from each other. The first rib 372 extends above and offset from a first recessed surface 390 and the second rib 382 extends above and offset from a second recessed surface 392, such as a second recessed surface 392 distinct from the first recessed surface 390. In various embodiments, first rib 372 extends from central wall 362 in direction 374 perpendicular to the direction 134, and second rib 382 extends from central wall 362 in direction 384 perpendicular to direction 134 and opposite direction 374. In a specific embodiment, the plurality of couplers 360 includes at least six couplers arranged in a grid (e.g., 3×2 as shown on the right-half of platform 138, or 3×4 over the entirety of platform 138).

Referring to FIGS. 11-14, support structure 210 is shown according to an exemplary embodiment. Support structure 210 is substantially the same as support structure 110 except for the differences discussed herein. In particular, locking mechanism 250 of support structure 210 includes a different structure than locking mechanism 150 of support structure 110.

Locking mechanism 250 biases second arm 232 to remain stationary with respect to first arm 230 when in the first locked position and the second locked position. To remove a platform 238 away from the wall, a user actuates locking mechanism 250 to access the utility module coupled to the respective platform 238.

Locking mechanism 250 includes a pin lock 258 that rotates about axis 262 when user actuates rod 256 (e.g., actuating a plate at the front of locking mechanism 250 slides rod 256 towards the front of the platform 238). Protrusion 260 extends from pin lock 258 and selectively interfaces with first arm 230. A biasing element, shown as spring 264, biases pin lock 258 in direction 266 around axis 262, thereby biasing locking mechanism 250 towards the locked position (e.g., the first locked position in the fully retracted position, or the second locked position in the fully extended position).

Protrusion 260 interfaces with first tab 270 to bias second arm 232 to remain in the fully retracted position with respect to first arm 230. Protrusion 260 interfaces with second tab 274 to bias second arm 232 to remain in the fully extended position with respect to first arm 230.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A support structure comprising:

a base configured to couple to a wall;

a first arm rigidly coupled to the base;

a second arm slidably coupled to the first arm, the second arm actuating with respect to the first arm between a fully retracted position and a fully extended position; and a platform rigidly coupled to the second arm such that the platform moves outward from the base when the second arm moves from the fully retracted position to the fully extended position, the platform comprising a plurality of female couplers configured to detachably couple the platform to a modular storage unit, each female coupler of the plurality of female couplers comprising two ribs extending towards each other above and offset from a recessed surface, each female coupler of the plurality of female couplers comprising a rear wall, a front wall, a first sidewall, and a second sidewall, the first sidewall and second sidewall extending between the front wall and the rear wall, wherein a first rib of the two ribs extends from the first sidewall towards the second sidewall and from the rear wall to the front wall, and wherein a second rib of the two ribs extends from the second sidewall towards the first sidewall and from the rear wall to the front wall.

2. The support structure of claim 1, the second arm sliding in a first direction when moving from the fully retracted position to the fully extended position, each of the two ribs extending from the rear wall in second direction parallel to the first direction.

3. The support structure of claim 2, comprising a latch recess configured to receive a latch extending from the modular storage unit, the interface between the latch recess and the latch biasing the modular storage unit to remain coupled to the platform via the plurality of female couplers, and wherein the latch recess is positioned between a front surface of the platform and the plurality of female couplers.

4. The support structure of claim 1, the second arm slides in a first direction when moving from the fully retracted position to the fully extended position, the first rib extending from the first sidewall in a second direction perpendicular to the first direction, and the second rib extending from the second sidewall in a third direction perpendicular to the first direction and opposite the second direction.

5. The support structure of claim 1, comprising a locking mechanism actuating between an unlocked configuration and a first locked configuration, the locking mechanism biasing the second arm to remain in the fully retracted position when the locking mechanism is in the first locked configuration.

6. The support structure of claim 1, comprising a locking mechanism actuating between an unlocked configuration and a second locked configuration, the locking mechanism biasing the second arm to remain in the fully extended position when the locking mechanism is in the second locked configuration.

7. The support structure of claim 1, comprising a plurality of latch recesses, each of which are configured to receive a latch extending from the modular storage unit, the interface between the latch and the respective latch recess of the plurality of latch recesses biasing the modular storage unit to remain coupled to the platform via the plurality of female couplers.

8. The support structure of claim 1, wherein the plurality of female couplers comprise at least six couplers arranged in a grid.

9. A support structure comprising:

a base configured to couple to a wall;

a first arm rigidly coupled to the base;

a second arm slidably coupled to the first arm, the second arm actuating with respect to the first arm between a fully retracted position and a fully extended position; and a platform rigidly coupled to the second arm such that the platform moves outward from the base when the second arm moves from the fully retracted position to the fully extended position, the platform comprising a plurality of female couplers configured to detachably couple the platform to a modular storage unit, each female coupler of the plurality of female couplers comprising a rear wall, a front wall, a first sidewall, a second sidewall, a first rib, and a second rib, the first rib and the second rib extending towards each other above and offset from a recessed surface, the first sidewall and second sidewall extending between the front wall and the rear wall, wherein a first rib of the two ribs extends from the first sidewall towards the second sidewall and from the rear wall to the front wall, and wherein a second rib of the two ribs extends from the second sidewall towards the first sidewall and from the rear wall to the front wall, wherein the plurality of female couplers are arranged in a grid.

10. The support structure of claim 9, comprising a latch recess configured to receive a latch extending from the modular storage unit, the interface between the latch recess and the latch biasing the modular storage unit to remain coupled to the platform via the plurality of couplers, and wherein the latch recess is positioned between a front surface of the platform and the plurality of female couplers.

11. The support structure of claim 9, the second arm slides in a first direction when moving from the fully retracted position to the fully extended position, the first rib extending from the central wall in a second direction perpendicular to the first direction, and the second rib extending from the central wall in a third direction perpendicular to the first direction and opposite the second direction.

12. The support structure of claim 9, comprising a locking mechanism actuating between an unlocked configuration and a first locked configuration, the locking mechanism biasing the second arm to remain in the fully retracted position when the locking mechanism is in the first locked configuration.

13. The support structure of claim 12, comprising the locking mechanism actuating between the unlocked configuration, the first locked configuration, and a second locked configuration, the locking mechanism biasing the second arm to remain in the fully extended position when the locking mechanism is in the second locked configuration.

14. A support structure comprising:

a base configured to couple to a wall;

a first arm coupled to the base;

a second arm slidably coupled to the first arm, the second arm actuating with respect to the first arm between a fully retracted position and a fully extended position;

a locking mechanism actuating between an unlocked configuration, a first locked configuration, and a second locked configuration, the locking mechanism biasing the second arm to remain in the fully retracted position when the locking mechanism is in the first locked configuration, the locking mechanism biasing the second arm to remain in the fully extended position when the locking mechanism is in the second locked configuration; and a platform rigidly coupled to the second arm, the platform comprising a plurality of female couplers configured to detachably couple the platform to a modular storage unit, and a latch recess configured to receive a latch extending from the modular storage unit, the interface between the latch recess and the latch biasing the modular storage unit to remain coupled to the platform via the plurality of female couplers, wherein each female coupler of the plurality of female couplers comprises one or more ribs extending above a recessed surface, each female coupler of the plurality of female couplers comprising a rear wall, a front wall, a first sidewall, and a second sidewall, the first sidewall and second sidewall extending between the front wall and the rear wall, wherein a first rib of the one or more ribs extends from the first sidewall towards the second sidewall and from the rear wall to the front wall, and wherein a second rib of the one or more ribs extends from the second sidewall towards the first sidewall and from the rear wall to the front wall.

15. The support structure of claim 14, wherein the latch recess is positioned between a front surface of the platform and the plurality of female couplers.

16. The support structure of claim 14, wherein the plurality of female couplers comprise at least six female couplers arranged in a grid.

17. The support structure of claim 14, wherein the first rib and the second rib are configured to engage with tongues extending from the modular storage unit.

* * * * *